US012656492B2

(12) United States Patent
    Ville

(10) Patent No.:    US 12,656,492 B2
(45) Date of Patent:    Jun. 16, 2026

(54) DISTANCE MEASUREMENT SENSOR WITH MULTIPLE MEMORY NODES

(71) Applicant: TELEDYNE E2V SEMICONDUCTORS SAS, Saint Egreve (FR)

(72) Inventor: Pierre-Emmanuel Ville, Grenoble (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 729 days.

(21) Appl. No.: 18/017,399

(22) PCT Filed: Jul. 21, 2021

(86) PCT No.: PCT/EP2021/070324
    § 371 (c)(1),
    (2) Date: Jan. 21, 2023

(87) PCT Pub. No.: WO2022/018113
    PCT Pub. Date: Jan. 27, 2022

(65) Prior Publication Data
    US 2023/0296741 A1    Sep. 21, 2023

(30) Foreign Application Priority Data
    Jul. 22, 2020    (FR) ...................................... 2007701

(51) Int. Cl.
    *G01S 17/36*        (2006.01)
    *G01S 7/481*        (2006.01)
    (Continued)

(52) U.S. Cl.
    CPC ............ *G01S 17/36* (2013.01); *G01S 7/4816* (2013.01); *G01S 7/4914* (2013.01);
    (Continued)

(58) Field of Classification Search
    CPC .... H04N 25/57; H04N 25/705; H04N 25/771; H04N 25/78; H04N 25/58; G01S 7/4914;
    (Continued)

(56) References Cited

U.S. PATENT DOCUMENTS

| | | | | |
|---|---|---|---|---|
| 9,207,065 B2 * | 12/2015 | Kim | ..................... | G01B 11/026 |
| 11,743,616 B2 * | 8/2023 | Tadmor | ................. | G01S 7/4863 |
| | | | | 348/308 |

(Continued)

FOREIGN PATENT DOCUMENTS

WO        2017170568 A1    10/2017

OTHER PUBLICATIONS

International Search Report and Written Opinion for PCT/EP2021/070324, mailed Nov. 9, 2021.

(Continued)

*Primary Examiner* — Lin Ye
*Assistant Examiner* — Chriss S Yoder, III
(74) *Attorney, Agent, or Firm* — Pilloff Passino & Cosenza LLP; Rachel K. Pilloff; Sean A. Passino

(57)        ABSTRACT

A CMOS image sensor (102) comprises:
  a set of Nk pixels with a specific global shutter architecture, including, for each pixel Pix#k, k varying from 1 to N, a device (104) for synchronously blocking the exposure, common to the various memory nodes $MN_{k,m}$, m varying from 1 to M;
  a subsystem for the non-destructive fast readout of the M memory nodes $MN_{k,m}$, m varying from 1 to M, of each pixel Pix#k, making it possible to control a decision criterion for each pixel;
  a decision mechanism, based on the computing of a criterion, making it possible to control the device for synchronously blocking the exposure, located at the pixel level, which criterion is defined on the basis of the (Continued)

results obtained by the non-destructive fast read operations on the various memory nodes $MN_{k,m}$, m varying from 1 to M;

a conventional full-resolution image readout subsystem (62) with analog-to-digital conversion.

13 Claims, 9 Drawing Sheets

(51) Int. Cl.

| | |
|---|---|
| *G01S 7/4912* | (2020.01) |
| *G01S 7/4914* | (2020.01) |
| *G01S 7/4915* | (2020.01) |
| *G01S 7/493* | (2006.01) |
| *G01S 17/894* | (2020.01) |
| *H04N 25/57* | (2023.01) |
| *H04N 25/58* | (2023.01) |
| *H04N 25/705* | (2023.01) |
| *H04N 25/771* | (2023.01) |
| *H04N 25/78* | (2023.01) |

(52) U.S. Cl.
CPC .......... *G01S 7/4915* (2013.01); *G01S 7/4918* (2013.01); *G01S 7/493* (2013.01); *G01S 17/894* (2020.01); *H04N 25/57* (2023.01); *H04N 25/58* (2023.01); *H04N 25/705* (2023.01); *H04N 25/771* (2023.01); *H04N 25/78* (2023.01)

(58) Field of Classification Search
CPC .... G01S 7/4915; G01S 7/4816; G01S 7/4918; G01S 7/493; G01S 17/36; G01S 17/894
See application file for complete search history.

(56) References Cited

U.S. PATENT DOCUMENTS

| | | | |
|---|---|---|---|
| 2010/0026838 A1 | 2/2010 | Belenky et al. | |
| 2016/0182847 A1* | 6/2016 | Wan ..................... | H04N 13/271 |
| | | | 250/206 |
| 2017/0227643 A1* | 8/2017 | Nagai .................. | G01S 7/4914 |
| 2020/0185439 A1* | 6/2020 | Jin .......................... | G01S 17/08 |

OTHER PUBLICATIONS

Communication from the Examining Division in EP Application No. 21758052.1, mailed Feb. 27, 2025.

\* cited by examiner

FIG.6

DISTANCE MEASUREMENT SENSOR WITH MULTIPLE MEMORY NODES

The present invention relates to a CMOS ("Complementary Metal Oxide Semiconductor") active-pixel image sensor with multiple nodes for indirect time-of-flight (IToF) distance measurement and to a method for implementing said image sensor.

The present invention also relates to a device for indirect time-of-flight IToF distance measurement on a scene of two-dimensional or three-dimensional objects and to a method for implementing said IToF distance-measuring device.

The invention is associated with the problems linked to implementing CMOS imagers to measure the distance between an imager system and various objects using what is called "indirect time-of-flight" technology.

IToF "indirect time-of-flight" technology, applied to CMOS sensors, requires measuring, with various phase offsets, light information reflected by a targeted object or target. This light information is generated by a source that is synchronized with high precision with the image sensor. By combining various phase-offset samples originating from one or more captures, it is possible, via the use of algorithms, to determine the distance of said targeted object.

The measured distance does not depend on the received signal level, but on the signal deviation measured between multiple phase-offset samples, captured under the same conditions (i.e. over one and the same integration time). However, the obtained signal-to-noise ratio depends on the measured signal level. To obtain the best precision with regard to this measured distance, it is necessary to maximize the signal-to-noise ratio on the phase-offset samples while still retaining their respective deviations. However, this is difficult to achieve with a single image capture (i.e. a single integration time) due to the very wide dynamic range of the scenes under observation.

The minimum and maximum distance ranges between the objects under observation and the measuring system, in combination with the reflectivities of the various materials forming the targeted subjects, contribute to increasing the dynamic range required to correctly image a scene captured in this type of application. Specifically, light sources of IToF systems are dimensioned in terms of emission power, as a function of the maximum distance to be measured, and the reflectivities of the targeted objects.

Increasing the dynamic range able to be addressed by the image sensor is therefore essential in order to have the best repeatability (or "precision") of the indirect time-of-flight IToF distance measurement, it being noted that the repeatability of a measurement should be distinguished from the accuracy of a measurement.

To increase the dynamic range of a CMOS imager, it is possible, according to a first type of method, to combine multiple image captures performed with various exposure times. However, obtaining each of these images requires a full-resolution analog-to-digital conversion. This first type of method exhibits numerous drawbacks:

- the full-resolution analog-to-digital data conversion is a time-consuming operation;
- the volume of data that has to be managed may become very large for the system responsible for utilizing the data from the imager, if the number of captures becomes large;
- spatial coherence artefacts may occur in the case of moving objects.

To increase the dynamic range of a CMOS imager, it is also possible, according to a second type of method, to increase the electronic capacity of the memory nodes at the pixel level. However, physical limits are quickly reached depending on the number of memory nodes and the size of the pixel. In addition, increasing the capacity of the memory nodes may cause problems in terms of the overall sensitivity of the CMOS imager and in terms of its readout noise. The CMOS imager will thus need more light to achieve the same signal at output.

To increase the dynamic range of a CMOS imager, it is also possible, according to a third type of method, to combine multiple exposure time information at the level of the CMOS sensor and to invoke compression to maintain the resolution at the output of the imager. This third type of method has the disadvantage of providing a non-linear response that complicates the use of the data at the system level.

Generally speaking, the problem of maximizing the dynamic range accessible to a CMOS imager requires multiple compromises between:

- the pitch of the pixel and the storage capacity of the one or more memory nodes of a pixel in line with the general sensitivity of a pixel;
- the volume of data transmitted by the imager;
- the maximum acquisition frequency of the imager; and
- the linearity of the response that is supplied.

In the case of extending this problem to indirect time-of-flight IToF applications, the intrinsic dynamic range of the scene under observation is then increased due to the addition of light information needed for the measurement. The repeatability of the indirect time-of-flight IToF measurement is dependent directly on the signal-to-noise ratio on the captured phase information.

The ideal solution should make it possible, all at the same time, to:

- maximize the signal-to-noise ratio (without saturation) of the various memory nodes for each of the pixels;
- maintain good sensitivity at the pixel level by limiting the storage capacity of the memory nodes for a given pixel pitch;
- limit the volume of data transmitted by the imager as far as possible;
- maximize the acquisition speed by reducing the number of (full-resolution) data conversions and the exposure duration;
- not invoke compression to maintain a linear response.

Document US 2016/182847 teaches the principle of performing non-destructive measurements on memory nodes of a matrix image sensor in order to inhibit exposure before a saturation situation is reached, but does not teach how to implement such a principle in practice without excessive complexity.

The technical problem addressed by the invention is that of finding a CMOS imager architecture suited to distance measurement with "indirect time-of-flight" technology and that cumulatively satisfies the requirements of maximizing the dynamic range accessible to said CMOS imager.

The basic concept of the invention is founded on the architecture of a CMOS imager that optimizes exposure independently for each of the pixels, maximizes the signal-to-noise ratio on each of the pixels, and that performs full-resolution conversion and transmission for just a single image in the case of an image acquisition without external correlated double sampling (CDS), or two images in the case of an image acquisition with external correlated double sampling CDS.

To this end, one subject of the invention is a CMOS active-pixel image sensor with multiple memory nodes for indirect time-of-flight IToF distance measurement on a scene under observation of reflective objects comprising:

a set of a whole number Nk, greater than or equal to 1, of CMOS active pixels Pix#k, k varying from 1 to Nk, each having a photosensitive area PhDk and a whole number M, greater than or equal to 2, of memory nodes $MN_{k,m}$, m varying from 1 to M;

an image readout subsystem for the M memory nodes $MN_{k,m}$ of each pixel Pix#k, k varying from 1 to Nk, for establishing, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum exposure image duration Tmax_exp, and supplying the M times Nk read digital values at output;

an image preprocessing subsystem configured to apply digital processing operations to said digital values supplied at output by the image readout subsystem and send preprocessed pixel-level image data to an application system for determining indirect times-of-flight IToF of a scene under observation;

the image sensor being characterized in that it comprises:

a subsystem for the fast readout of the Nk times M memory nodes $MN_{k,m}$ and for controlling a mechanism for inhibiting the exposure of the Nk pixels Pix#k, configured, on each of the Nk pixels Pix#k, k varying from 1 to Nk, to:

perform, during a current cycle Cycle_acq#k,s of acquiring an image from the Nk pixels of the sensor, a predetermined whole number Nr of non-destructive fast read operations FCr, r varying from 0 to Nr-1, on the voltages present on the M memory nodes $MN_{k,m}$, m varying from 1 to M, and after each fast read operation FCr, determine a signal for inhibiting the exposure of the pixel Pix#k, based on a decision criterion as to whether or not to continue the exposure of the pixel Pix#k, the decision criterion being dependent on the voltage values read non-destructively from the M memory nodes $MN_{k,m}$ after said fast read operation FCr; and in each pixel Pix#k, at least one transistor for inhibiting the exposure of the pixel and a memory point able to be charged or discharged by said signal for inhibiting the pixel Pix#k in order to activate or deactivate the mechanism for inhibiting the pixel by driving its one or more inhibition transistors.

According to some particular embodiments, the CMOS active-pixel image sensor with multiple memory nodes for indirect time-of-flight IToF distance measurement comprises one or more of the following features:

each pixel Pix#k, k varying from 1 to Nk, is configured to have its M memory nodes $MN_{k,m}$, m varying from 1 to M, integrate the electric charges generated by the photosensitive area PhDk during r elementary integration intervals INTr, r varying from 0 to Nr-1, each elementary integration interval INTr being followed by a fast read operation FCr on the M memory nodes $MN_{k,m}$ and by a re-evaluation of the inhibition decision criterion, and the r integration intervals INTr, distributed in the current cycle Cycle_acq#s of acquiring a pixel image, respectively have elementary durations Tr such that the sum of the elementary integration durations Tr, r varying from 0 to Nr-1, is equal to the predetermined maximum exposure image duration Tmax_exp;

the elementary durations Tr, r varying from 0 to Nr, are equal to one and the same value; or at least two elementary durations taken from among the set of values Tr, r varying from 0 to Nr-1, are different and the distribution of the values Tr, r varying from 0 to Nr-1, is chosen so as to maximize the dynamic range of the sensor;

the image sensor comprises a sequencer for activating phases of a set of phases implemented during the current cycle Cycle_acq#s by sending commands to the Nk pixels, k varying from 1 to Nk, to the subsystem for the fast readout of the Nk times M memory nodes $MN_{k,m}$ and for controlling the mechanism for inhibiting the exposure of the Nk pixels Pix#k, to the image preprocessing subsystem, said set of phases comprising:

for each pixel Pix#k, k varying from 1 to Nk, phases of resetting (Reset or Rst) the photosensitive area PhDk and the M memory nodes $MN_{k,m}$, m varying from 1 to M, phases of non-destructive fast readout of the M memory nodes (FCr), a phase (exp0) of initially exposing the pixel Pix#k followed by a first number Nr1(k,s) of one or more phases of maintaining the exposure (Exp) of the pixel Pix#k and then by a number Nr2(k,s) of one or more phases of inhibiting (Blocked) the exposure of the pixel Pix#k, the sum of the numbers Nr1(k,s) and Nr2(k, s) being equal to Nr-1, and by a phase of image readout (Read) from the pixel Px#k; and the phases of resetting (Reset or Rst) the photosensitive areas PhDk and the M memory nodes $MN_{k,m}$, k varying from 1 to Nk and m varying from 1 to M, are executed at the same time as each acquisition of an image s in a "global shutter" mode of the Nk pixels of the image sensor;

for each pixel Pix#k, k varying from 1 to Nk, an image read operation is performed after a phase of resetting the photosensitive area PhDk and the M memory nodes $MN_{k,m}$, m varying from 1 to M, said image read operation being used to carry out external CDS;

each pixel Pix#k, k varying from 1 to Nk, configured with one and the same architecture, comprises: the photosensitive area PhDk; a transistor T1k for resetting the photosensitive area PhDk at the start of each cycle of acquiring an image and at the start or at the end of each micro-integration cycle, the first transistor T1k being controlled by a global reset signal RPhk common to the Nk pixels of the set of pixels; M memory nodes $MN_{k,m}$, m varying from 1 to M, for the shared storage, on M storage channels $VS_{k,m}$, of the charges generated by the photosensitive area PhDk, and integrated in parallel during the exposure duration of the pixel Pix#k corresponding to the current cycle Cycle_acq#k,s of acquiring an image; a device for synchronously blocking the exposure of the pixel Pix#k, common to the various M memory nodes Mk,m, m varying from 1 to M; a device for activating access for the pixel Pix#k to the subsystem for the fast readout of the Nk times M memory nodes and for controlling the mechanism for inhibiting the Nk pixels and to the image readout subsystem for the M memory nodes of the pixel Pix#k via M independent read access conductors $COL_{k,m}$, m varying from 1 to M, and an inhibition command access channel $COL_{k,IM}$;

for each pixel Pix#k, k varying from 1 to NK, each storage channel $VS_{k,m}$, m varying from 1 to M, for storing the charges generated by the photosensitive area PhDk comprises: a charge transfer transistor $T2_{k,m}$, configured to drain, in the memory node $MN_{k,m}$, the charges generated during the exposure image duration of the pixel Pix#k, and controlled by a charge transfer control signal $TRA_{k,m}$; a transistor $T3_{k,m}$ for resetting the memory node $MN_{k,m}$, configured to reset the potential of the memory node $MN_{k,m}$ at the start of the current cycle Cycle_acq#k,s of an image, and controlled by a reset signal by a signal RST common to the set of Nk pixels;

a transistor $T4_{k,m}$ for reading the memory node $MN_{k,m}$ connected in a follower configuration and configured to return, from its gate to its source, the potential level of the memory node $MN_{k,m}$; and a selection transistor $T5_{k,m}$, connected to the source of the transistor $T4_{k,m}$ for reading the memory node $MN_{k,m}$, configured to return, to the access conductor $COL_{k,m}$ in read mode via the image readout subsystem for the M memory nodes of the pixel Pi#k, the charge potential of the memory node $MN_{k,m}$, and controlled by a control signal $SEL_k$ for controlling access to the pixel Pix#k;

for each pixel Pix#k, k varying from 1 to Nk, the device for synchronously blocking the exposure of the pixel Pix#k, common to the various M memory nodes $MN_{k,m}$, m varying from 1 to M, is configured to modulate the control signals $TRA_{k,m}$, m varying from 1 to M, for transferring the charges generated during the exposure image duration of the pixel Pix#k, by a common modulating signal inhibiting the transfer of the charges by the charge transfer transistors $T2_{k,m}$, activated when the subsystem for the fast readout of the Nk times M memory nodes and for controlling the mechanism for inhibiting the Nk pixels has decided, in line with the values read in previous non-destructive fast read operations, not to continue the exposure of the pixel, and maintained until the pixel is fully read, and comprises, for each storage channel $VS_{k,m}$, m varying from 1 to M, for storing the charges generated by the photosensitive area PhDk, a transistor $TI_{k,m}$ for inhibiting the charge transfer control signal $TRA_{k,m}$;

for each pixel Pix#k, k varying from 1 to Nk, the device for synchronously blocking the exposure of the pixel Pix#k, common to the various M memory nodes $MN_{k,m}$, m varying from 1 to M, is configured to modulate the drainage of the charges generated by the photosensitive area PhDk during the exposure image duration of the pixel Pix#k to a common connecting node connecting the M charge transfer transistors $T2_{k,m}$, m varying from 1 to M, by a common modulating signal inhibiting the drainage of the charges to said common connecting node, activated when the subsystem for the fast readout of the Nk times M memory nodes and for controlling the mechanism for inhibiting the Nk pixels has decided, in line with the values read during previous non-destructive fast read operations, not to continue the exposure of the pixel Pix#k, and maintained until the pixel is fully read, and comprises, connected in parallel with the transistor T1k for resetting the photosensitive area PhDk, a transistor $TI_{k,m}$ for inhibiting the drainage of the charges generated by the photosensitive area PhDk to said common node;

the Nk pixels, k varying from 1 to Nk, are arranged in a matrix form 54 in a whole number Nl, greater than or equal to 2, of rows, and a whole number Nc, greater than or equal to 2, of columns, Nk being equal to the product of Nc and NI; and the image sensor furthermore comprises a row decoder, configured to allow, row by row over predetermined time windows and at the same time, the pixels of one and the same row $\underline{I}$ to access the processing resources of the subsystem for full-resolution image readout and the subsystem for the fast and non-destructive readout of the Nc times M memory nodes $MN_{k,m}$ and for controlling the mechanism for inhibiting the exposure of the Nc pixels of said same row $\underline{I}$, and thus pool the processing resources of the subsystem for full-resolution image readout and of the subsystem for fast readout and for controlling the mechanism for inhibiting the exposure of the pixels column by column.

Another subject of the invention is a device for indirect time-of-flight IToF distance measurement on a two-dimensional or three-dimensional object scene comprising: an emitter source emitting a series of light pulses; a CMOS active-pixel image sensor with multiple memory nodes as defined above for converting the light pulses reflected by the objects in the scene into pixel data characterizing one or more images; and a block for processing the pixel data from the one or more images in order to determine a field of depths of the objects in the scene seen from a location where the emitter source and the image sensor are located.

Another subject of the invention is a method for implementing a CMOS active-pixel image sensor with multiple memory nodes for indirect time-of-flight IToF distance measurement on a scene under observation, the image sensor comprising: a set of a whole number Nk, greater than or equal to 1, of CMOS active pixels Pix#k, k varying from 1 to Nk, each having a photosensitive area PhDk and a whole number M, greater than or equal to 2, of memory nodes $MN_{k,m}$, m varying from 1 to M; a subsystem for the non-destructive fast readout of the Nk times M memory nodes $MN_{k,m}$ and for controlling the mechanism for inhibiting the exposure of the Nk pixels Pix#k, implemented during the acquisition of an image by the Nk pixels; an image readout subsystem for the M memory nodes $MN_{k,m}$ of each pixel Pix#k, k varying from 1 to Nk; an image preprocessing subsystem; the image sensor being characterized in that it comprises:

a subsystem for the non-destructive fast readout of the Nk times M memory nodes $MN_{k,m}$ and for controlling the mechanism for inhibiting the exposure of the Nk pixels Pix#k.

The method for implementing the image sensor during the acquisition of an image comprises steps in which: the image readout subsystem reads the M memory nodes $MN_{k,m}$ of each pixel Pix#k, k varying from 1 to Nk, establishes, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum exposure image duration Tmax_exp, and supplying the M times Nk read digital values at output; and the image preprocessing subsystem applies digital processing operations to said digital values supplied at output by the image readout subsystem and sends preprocessed pixel-level image data to an application system for determining indirect times-of-flight IToF of a scene under observation.

The method for implementing the image sensor is characterized in that the subsystem for the non-destructive fast readout of the Nk times M memory nodes $MN_{k,m}$ and for controlling the mechanism for inhibiting the exposure of the Nk pixels Pix#k, on each of the Nk pixels Pix#k, k varying from 1 to Nk, performs, during a current cycle Cycle_acq#k,s of acquiring an image s, a predetermined whole number Nr of non-destructive fast read operations FCr, r varying from 0 to Nr-1, on the voltages present on the M memory nodes $MN_{k,m}$, m varying from 1 to M, and after each fast read operation FCr, determines a signal for inhibiting the exposure of the pixel Pix#k, based on a decision criterion as to whether or not to continue the exposure of the pixel Pix#k, the decision criterion being dependent on the voltage values read non-destructively from the M memory nodes $MN_{k,m}$ after said fast read operation FCr and on one or more decision thresholds.

The invention will be better understood upon reading the following description of several embodiments, which description is given solely by way of example and with reference to the appended drawings, in which:

FIG. 6 is a view of one example of the sequencing of the principle at the pixel level of the CMOS image sensor from FIG. 4;

Figure 1:
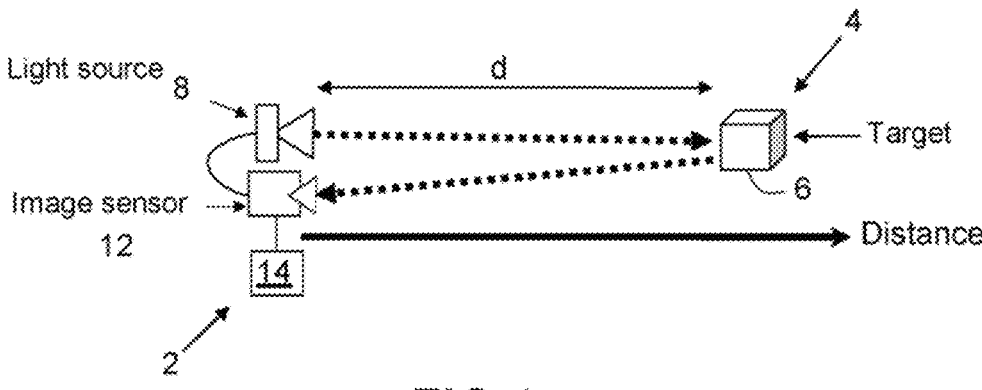
FIG. 1 is a view illustrating the general operating principle of IToF technology applied to a CMOS image sensor according to the invention.

According to FIG. 1, the basic principle for indirect time-of-flight distance measurement on a two-dimensional or three-dimensional object scene performed by a measuring device according to the invention is described.

A measuring device 2 according to the invention is configured to measure indirect time-of-flight IToF distances of objects or targets forming part of a two-dimensional or three-dimensional scene under observation 4. In FIG. 1, just one object 6 is shown to simplify the illustration.

The measuring device 2 according to the invention comprises a light-emitting source 8, an image sensor 12 according to the invention, and an IToF processing block 14 for processing pixel image data.

The light source 8 is configured to illuminate the scene under observation 4 and emit a series or a train of light pulses.

The image sensor 12 according to the invention is a CMOS active-pixel image sensor with multiple nodes, configured to convert the light pulses, reflected by the objects in the scene, in particular the object 6, into pixel data characterizing one or more images.

The IToF processing block for processing pixel image data, supplied by the image sensor 12, is configured to determine a field of depths of the objects in the scene seen from a location where the light-emitting source 8 and the image sensor 12 according to the invention are located.

The basic principle of IToF technology, applied to CMOS sensors, is founded on measuring, with various phase offsets, light information reflected by a targeted object 6 or target. This light information is generated by a light source 8 that is synchronized with high precision with the image sensor 12. By combining the various phase-offset samples, it is possible, via the use of algorithms, to determine the distance $\underline{d}$ of said targeted object. The train of light pulses emitted by the light source 8 is characterized by the unit duration of a pulse, denoted "T_pulse", and a repetition duty cycle of the pulse. As a variant, the light information may be generated based on a sinusoidal modulation of the light.

Figure 2:
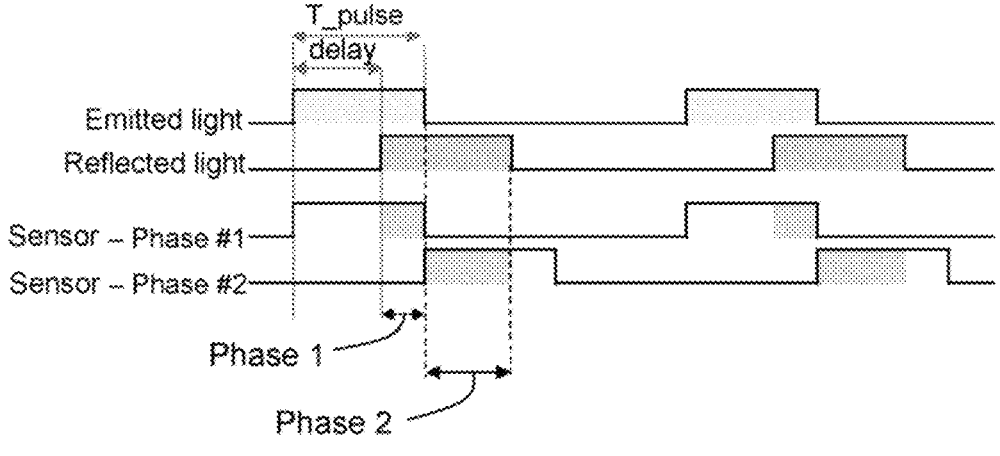
FIG. 2 is a view of one example of a two-phase algorithm for determining the distance separating a targeted object or target in a two-dimensional or three-dimensional scene under observation and the CMOS image sensor according to the invention.

According to FIG. 2 and by way of example, a two-phase algorithm for determining the distance $\underline{d}$ separating a targeted object or target 6 and the CMOS image sensor 12 according to the invention is illustrated. The distance separating a reflective object under observation from the sensor, denoted $\underline{d}$, is given by the following equation:

$$d = \frac{C * T\_pulse}{2} * \frac{Phase2}{Phase1 + Phase2}$$

in which
c denotes the speed of light, "T_pulse" denotes the duration of a pulse, "phase1" denotes the signal integrated over the duration of a first time interval, delimited by the rising edge, received by the sensor 12, of a pulse reflected by the object 6 and the falling edge of the corresponding pulse emitted by the light source 8, which pattern may be repeated multiple times in order to accumulate more signal, and "phase 2" denotes the signal integrated over the duration of a second time interval, delimited by the falling edge, received by the sensor 12, of the same reflected pulse and the falling edge of the corresponding pulse emitted by the light source 8, which pattern may be repeated multiple times in order to accumulate more signal.

Generally speaking, the architecture of an image sensor according to the invention is a synchronous architecture that makes it possible to capture correctly exposed images of a scene with a very high dynamic range by using a device for controlling exposure that is independent for each of the pixels, each of the pixels comprising multiple memory nodes, i.e. a number greater than or equal to two nodes. This architecture is particularly suitable for use with "indirect time-of-flight" technology as it makes it possible to maximize the repeatability of the measurement for each pixel.

Figure 3:
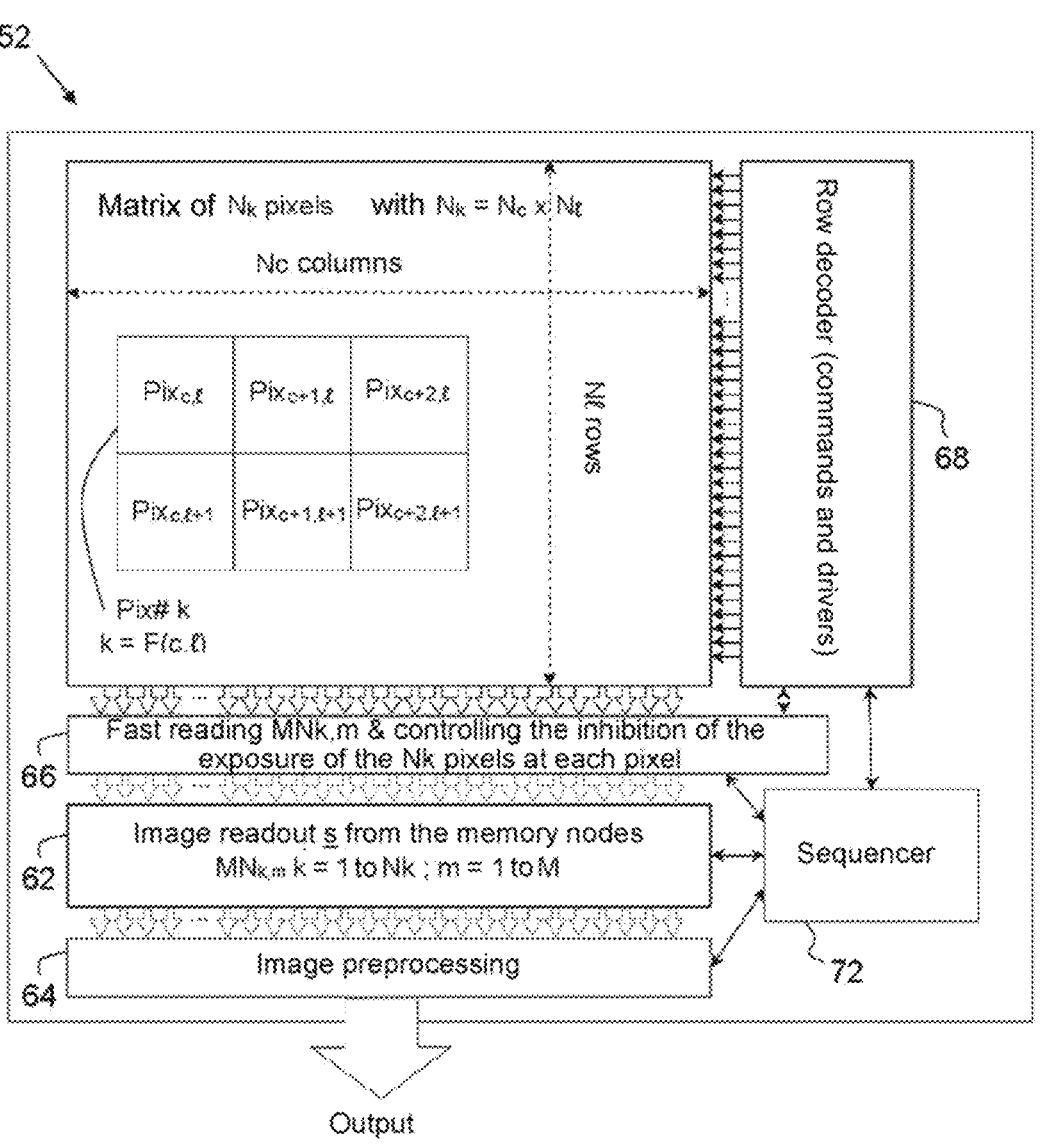
FIG. 3 is a view of a CMOS image sensor formed of a number Nk of pixels arranged in a preferred matrix embodiment with columns and rows, this embodiment being able to be applied generally to a CMOS image sensor formed of a set of Nk pixels according to the invention.

According to FIG. 3, a CMOS image sensor 52 according to the invention comprises a set of a whole number Nk, greater than or equal to 1, of CMOS active pixels Pix#k, k varying from 1 to Nk, each having a photosensitive area PhDk, formed for example by a photodiode, and a whole number M, greater than or equal to 2, of memory nodes $MN_{k,m}$, m varying from 1 to M.

According to FIG. 3, and in particular, the Nk pixels, k varying from 1 to Nk, are arranged in the form of a matrix 54 in a whole number Nl, greater than or equal to 2, of rows 56, and a whole number Nc, greater than or equal to 2, of columns 58, Nk being equal to the product of Nc and Nl. Each pixel Pix(c, l) of the matrix is referenced in the matrix and identified uniquely by a pair of indices (c, l), wherein $\underline{c}$ and $\underline{l}$ respectively denote the index $\underline{c}$ of the column and the index $\underline{l}$ of the row to which the pixel Pix(c,l) belongs.

With a biunivocal correspondence F being defined between the set of pairs of indices (c,l), the column index c varying from 1 to Nc and the row index varying from 1 to Nl, on the one hand, and the set of integers from 1 to Nk, on the other hand, each pixel Pix(c, l) may be denoted in line with this correspondence Pix#F(x,l) or Pix#k with k equal to F(c,l).

Each CMOS active pixel Pix#k, k varying from 1 to Nk, comprises a photosensitive area PhDk and a whole number M, greater than or equal to 2, of memory nodes $MN_{k,m}$, m varying from 1 to M.

The CMOS image sensor 52 comprises:

a full-resolution image readout subsystem 62 for the M memory nodes $MN_{k,m}$ of each pixel Pix#k, k varying from 1 to Nk, in order to establish, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum exposure image duration Tmax_exp, and supply the M times Nk read digital values at output;

an image preprocessing subsystem 64 configured to apply digital processing operations to said digital values supplied at output by the image readout subsystem 62 and send preprocessed pixel-level image data to an application system for determining indirect times-of-flight IToF of a scene under observation.

The CMOS image sensor 52 also comprises:

a subsystem 66 for the fast and non-destructive readout of the Nk times M memory nodes $MN_{k,m}$ and for controlling the inhibition of the exposure of the Nk pixels Pix#k, configured, on each of the Nk pixels Pix#k, k varying from 1 to Nk, to perform, during a current cycle Cycle_acq#k,s of acquiring an image from the Nk pixels of the sensor, a predetermined whole number Nr of non-destructive fast read operations FCr, r varying from 0 to Nr-1, on the voltages present on the M memory nodes $MN_{k,m}$, m varying from 1 to M, and after each fast read operation FCr, determine a signal for inhibiting the exposure of the pixel Pix#k, based on a decision criterion as to whether or not to continue the exposure of the pixel Pix#k, the decision criterion being dependent on the voltage values read non-destructively from the M memory nodes $MN_{k,m}$ after said fast read operation FCr.

The CMOS image sensor 52 comprises, specifically for the row/column matrix architecture from FIG. 3, a row decoder 68 that allows the pixels of one and the same row, over predetermined time windows, to access exclusively the processing resources of the full-resolution image readout subsystem 62 and of the subsystem 66 for the fast and non-destructive readout of the Nk times M memory nodes $MN_{k,m}$ and for controlling the inhibition of the exposure of the Nk pixels of said same row, and to pool the processing resources of the full-resolution image readout subsystem 62 and of the subsystem 66 for fast readout and for controlling the inhibition of the exposure of the pixels.

The CMOS image sensor 52 comprises a sequencer 72 for activating phases during the current cycle Cycle_acq#s by sending commands to the Nk pixels, k varying from 1 to Nk, to the subsystem for the fast readout of the Nk times M memory nodes $MN_{k,m}$ and for controlling the inhibition of the exposure of the NK pixels Pix#k, to the image prepro-cessing subsystem and specifically for the architecture from FIG. 3.

Generally speaking, a CMOS active-pixel image sensor according to the invention with multiple memory nodes for indirect time-of-flight IToF distance measurement on a scene under observation of reflective objects comprises:

a set of a whole number Nk, greater than or equal to 1, of CMOS active pixels Pix#k, k varying from 1 to Nk, each having a photosensitive area PhDk and a whole number M, greater than or equal to 2, of memory nodes $MN_{k,m}$, m varying from 1 to M;

an image readout subsystem for the M memory nodes $MN_{k,m}$ of each pixel Pix#k, k varying from 1 to Nk, for establishing, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum expo-sure image duration Tmax_exp, and supplying the M times Nk read digital values at output;

an image preprocessing subsystem configured to apply digital processing operations to said digital values supplied at output by the image readout subsystem and send preprocessed pixel-level image data to an appli-cation system for determining indirect times-of-flight IToF of a scene under observation.

Generally speaking, the image sensor is characterized in that it comprises:

a subsystem for the fast readout of the Nk times M memory nodes $MN_{k,m}$ and for controlling the inhibition of the exposure of the Nk pixels Pix#k, configured, on each of the Nk pixels Pix#k, k varying from 1 to Nk, to perform, during a current cycle Cycle_acq#k,s of acquiring an image from the Nk pixels of the sensor, a predetermined whole number Nr of non-destructive fast read operations FCr, r varying from 0 to Nr-1, on the voltages present on the M memory nodes $MN_{k,m}$, m varying from 1 to M, and after each fast read operation FCr, determine a signal for inhibiting the exposure of the pixel Pix#k, based on a decision criterion as to whether or not to continue the exposure of the pixel Pix#k, the decision criterion being dependent on the voltage values read non-destructively from the M memory nodes $MN_{k,m}$ after said fast read operation FCr.

Each pixel Pix#k, k varying from 1 to Nk, is configured to have its M memory nodes $MN_{k,m}$, m varying from 1 to M, integrate the electric charges generated by the photosensitive area PhDk during r elementary integration intervals INTr, r varying from 0 to Nr-1, each elementary integration interval INTr being followed by a fast read operation FCr on the M memory nodes $MN_{k,m}$ and by a re-evaluation of the inhibition decision criterion (except for the last integration phase Nr-1). The Nr integration intervals INTr, distributed in the current cycle Cycle_acq#s of acquiring a pixel image, respectively have elementary durations Tr such that the sum of the elementary integration durations Tr, r varying from 0 to Nr-1, is equal to the predetermined maximum exposure image duration Tmax_exp.

The elementary durations Tr, r varying from 0 to Nr, may be equal to one and the same value.

As a variant, at least two elementary durations taken from among the set of values Tr, r varying from 0 to Nr-1, are different and the distribution of the values Tr, r varying from 0 to Nr-1, is chosen so as to maximize the dynamic range of the sensor.

Generally speaking, the CMOS image sensor according to the invention comprises a sequencer for activating phases of a set of phases implemented during the current cycle Cycle_acq#s by sending commands to the Nk pixels, k varying from 1 to Nk, to the subsystem for the fast readout of the Nk times M memory nodes $MN_{k,m}$ and for controlling the inhibition of the exposure of the Nk pixels Pix#k, to the image preprocessing subsystem, said set of phases comprising:

for each pixel Pix#k, k varying from 1 to Nk, phases of resetting (Reset or Rst) the photosensitive area PhDk and the M memory nodes $MN_{k,m}$, m varying from 1 to M, phases of non-destructive fast readout of the M memory nodes (FCr), a phase (exp0) of initially exposing the pixel Pix#k followed by a first number Nr1(k,s) of one or more phases of maintaining the exposure (Exp) of the pixel Pix#k and then by a number Nr2(k,s) of one or more phases of inhibiting (Blocked) the exposure of the pixel Pix#k, the sum of the numbers Nr1(k,s) and Nr2(k, s) being equal to Nr-1, and by a phase of image readout (Read) from the pixel Px#k; and the phases of resetting (Reset or Rst) the photosensitive areas PhDk and the M memory nodes $MN_{k,m}$, k varying from 1 to Nk and m varying from 1 to M, are executed at the same time as each acquisition of an image s in a "global shutter" mode of the Nk pixels of the image sensor.

Figure 4:
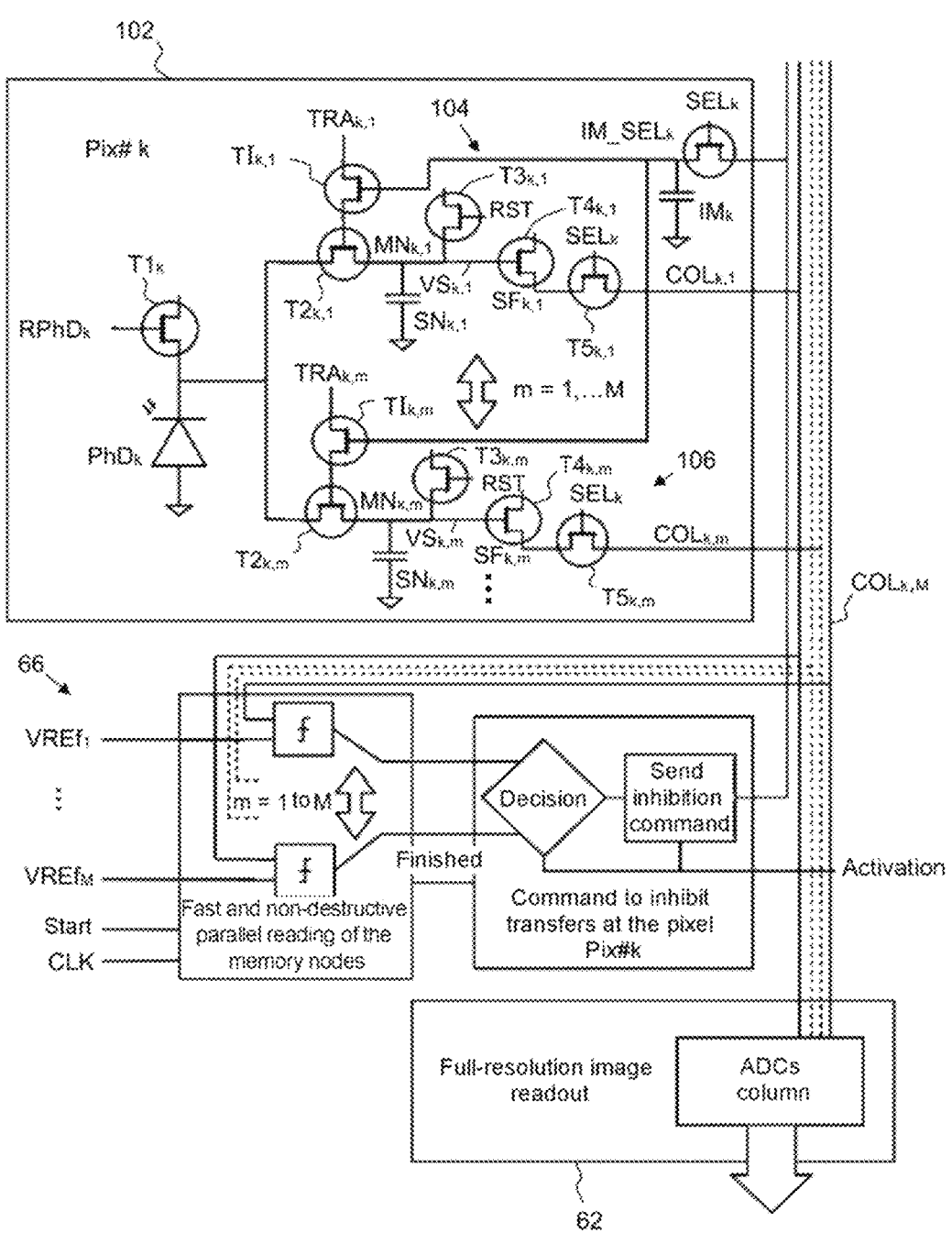
FIG. 4 is a view according to a first embodiment of a pixel and its environment, integrated into the image sensor from FIG. 3, and more generally into an image sensor according to the invention.

According to FIG. 4 and a first embodiment of a pixel Pix#k and its environment, integrated into the image sensor from FIG. 3, and more generally into an image sensor according to the invention, each pixel Pix#k, k varying from 1 to Nk, is integrated into an image sensor architecture based on analog-to-digital converters for full-resolution image readout in columns, each pixel Pix#k, k varying from 1 to Nk, having one and the same number M of memory nodes.

Each pixel Pix#k, k varying from 1 to Nk, a single pixel 102 being shown generically in FIG. 4, is configured in accordance with one and the same generic architecture, and comprises:

the photosensitive area PhDk;

a transistor T1k for resetting the photosensitive area PhDk at the start of each cycle of acquiring an image and at the start or at the end of each micro-integration cycle or interval (i.e. also each elementary integration interval INTr, r varying from 0 to Nr-1), the first transistor T1k being controlled by a global reset signal RPhk common to the Nk pixels of the set of pixels;

M memory nodes $MN_{k,m}$, m varying from 1 to M, for the shared storage, on M storage channels $VS_{k,m}$, of the charges generated by the photosensitive area PhDk, and integrated in parallel during the exposure duration of the pixel Pix#k corresponding to the current cycle Cycle_acq#k,s of acquiring an image;

a device 104 for synchronously blocking the exposure of the pixel Pix#k, common to the various M memory nodes Mk,m, m varying from 1 to M;

a device 106 for activating access for the pixel Pix#k to the subsystem for the fast readout of the Nk times M memory nodes and for controlling the inhibition of the Nk pixels and to the image readout subsystem for the M memory nodes of the pixel Pix#k via M independent read access conductors $COL_{k,m}$, m varying from 1 to M, and an inhibition command access channel $COL_{k,IM}$.

The transistor T1k, k varying from 1 to Nk, is used to reset the photosensitive area PhDk at the start of the capture sequence, but also at the start or at the end of each micro-integration window ("gating") (i.e. each elementary integration interval INTr) in order to drain the charges photo-generated outside the integration time intervals to be considered for the payload signal. Indeed, these stored parasitic charges have to be drained as they form additional noise that should not be accumulated.

For each pixel Pix#k 102, k varying from 1 to NK, each storage channel $VS_{k,m}$, m varying from 1 to M, for storing the charges generated by the photosensitive area PhDk comprises:

a charge transfer transistor $T2_{k,m}$, configured to drain, in the memory node $MN_{k,m}$, the charges generated during the exposure image duration of the pixel Pix#k, and controlled by a charge transfer control signal $TRA_{k,m}$;

a transistor $T3_{k,m}$ for resetting the memory node $MN_{k,m}$, configured to reset the potential of the memory node $MN_{k,m}$ at the start of the current cycle Cycle_acq#k,s of an image, and controlled by a reset signal by a signal RST common to the set of Nk pixels;

a transistor $T4_{k,m}$ for reading the memory node $MN_{k,m}$ connected in a follower configuration and configured to return, from its gate to its source, the potential level of the memory node $MN_{k,m}$; and a selection transistor $T5_{k,m}$, connected to the source of the transistor $T4_{k,m}$ for reading the memory node $MN_{k,m}$, configured to return, to the access conductor $COL_{k,m}$ in read mode via the image readout subsystem for the M memory nodes of the pixel Pix#k, the charge potential of the memory node $MN_{k,m}$, and controlled by a control signal SELk for controlling access to the pixel Pix#k.

According to FIG. 4 and the first embodiment of the pixel 102, for each pixel Pix#k 102, k varying from 1 to Nk, the device 104 for synchronously blocking the exposure of the pixel Pix#k, common to the various M memory nodes $MN_{k,m}$, m varying from 1 to M, is configured to modulate the control signals $TRA_{k,m}$, m varying from 1 to M, for transferring the charges generated during the exposure image duration of the pixel Pix#k, by a common modulating signal inhibiting the transfer of the charges by the charge transfer transistors $T2_{k,m}$, activated when the subsystem for the fast readout of the Nk times M memory nodes and for controlling the inhibition of the Nk pixels has decided, in line with the values read in previous non-destructive fast read operations, not to continue the exposure of the pixel, and maintained until the pixel is fully read, and comprises, for each storage channel $VS_{k,m}$, m varying from 1 to M, for storing the charges generated by the photosensitive area PhDk, a transistor $TI_{k,m}$ for inhibiting the charge transfer control signal $TRA_{k,m}$.

A decision criterion is defined on the basis of the application for which the sensor is used. This criterion is based for example on the results of the fast conversions of the various memory nodes in order to evaluate whether or not it is necessary to continue the exposure of the pixel. This criterion may be for example a thresholding with respect to a configurable voltage, for example common to all of the columns, making it positive as soon as one of the memory nodes stores a signal greater than the reference voltage, and negative otherwise. This criterion may be, as illustrated in FIG. 4, a thresholding with respect to multiple configurable voltages, which are different depending on the readout columns of the memory nodes.

According to FIG. 4, the device 104 for synchronously blocking the exposure of the pixel Pix#k 104 or mechanism for inhibiting the exposure of the pixel takes the form of an inhibition memory point $IM_k$ (or "Inhibitor Memory") filtering or not filtering the signals for controlling the transistors for transferring the charges accumulated in the photosensitive area to the memory nodes or signals $TRA_{k,m}$, m varying from 1 to M. This filtering is performed toward inhibition transistors $TI_{k,m}$ (or "Transfer Inhibitors") positioned on the rows for the signals for controlling the transfer transistors $TRA_{k,m}$, m varying from 1 to M.

The memory point IMk of the inhibition mechanism is accessed via the transistor controlled by the row selection transistor $SEL_k$. When it is selected, the memory point $IM\_SEL_k$ may be charged or discharged in order to deactivate or activate the mechanism for inhibiting the exposure on the pixel in question by driving its inhibition transistors $TI_{k,m}$, m varying from 1 to M.

To sum up, the CMOS image sensor 102, according to the first embodiment of FIG. 4 and its variants, comprises:

- a set of a whole number Nk, greater than or equal to one, of pixels with a specific electronic global shutter architecture, including, for each pixel Pix#k, k varying from 1 to Nk, a device 104 for synchronously blocking the exposure, common to the various memory nodes $MN_{k,m}$, m varying from 1 to M;
  - a subsystem for the non-destructive fast readout of the M memory nodes $MN_{k,m}$, m varying from 1 to M, of each pixel Pix#k, shared between the memory nodes $MN_{k,m}$, m varying from 1 to M, or dedicated to each memory node $MN_{k,m}$, making it possible to control a decision criterion for each pixel;
  - a decision mechanism, based on the computing of a criterion, making it possible to control a device for inhibiting the exposure located at the pixel level, which criterion is defined on the basis of the results obtained by the non-destructive fast read operations on the various memory nodes $MN_{k,m}$, m varying from 1 to M;
  - conventional full-resolution image readout chain with analog-to-digital conversion.

Figure 5:
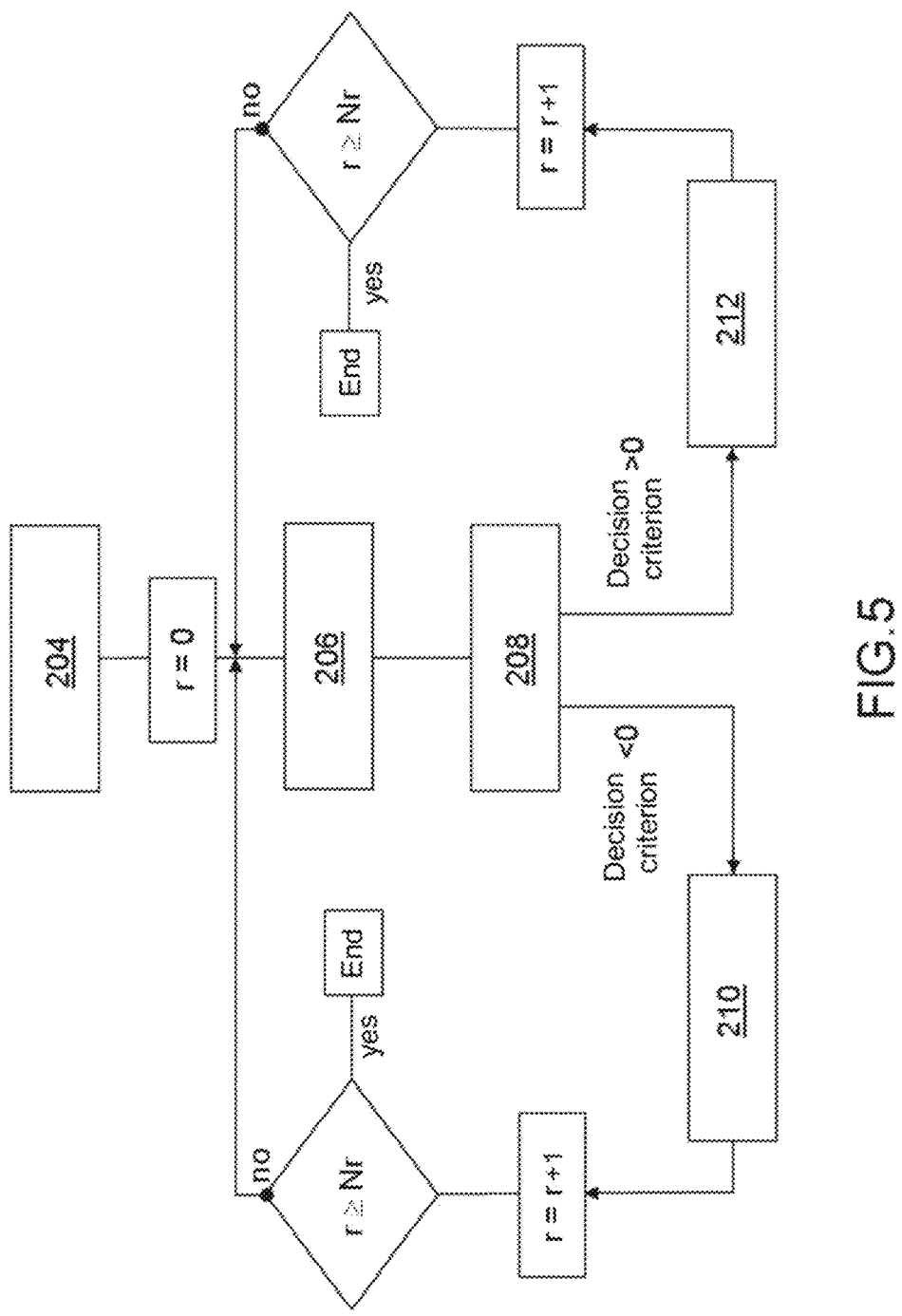
FIG. 5 is a flowchart of the method for implementing the CMOS image sensor according to the invention from FIG. 3.

According to FIG. 5, a method 202 for operating the CMOS image sensor according to the invention comprises a set of steps 204, 206, 206, 208, 210, 212 and 214.

In a first step 204, all of the pixels of the image sensor are reset, the charges stored in the memory nodes $MN_{k,m}$, k varying from 1 to Nk and m varying from 1 to M, and the photosensitive area PhDk of each of the pixels Pix#k, k varying from 1 to Nk, are drained.

Next, in a second step 206, an exposure phase is carried out on the pixels, during which the inhibition mechanism is inactive.

The second step 206 is followed by a third step 208 in which a phase of non-destructive fast read operations on the memory nodes $MN_{k,m}$, m varying from 1 to M, is carried out for each of the pixels Pix#k, k varying from 1 to Nk, in order to determine, in the same third step 208, the result of the decision criterion.

If the decision criterion is negative, in a fourth step 210, the mechanism for inhibiting exposure is kept deactivated, this authorizing accumulation of the signal, that is to say of the charges, in the memory nodes of the pixel in question in the next exposure.

If the decision criterion is positive, in a fifth step 212, the mechanism for inhibiting exposure is activated or remains activated, and kept activated in the following exposure phase, thus fixing the signal level (i.e. the quantity of charges) accumulated in the memory nodes of the pixel in question in the next exposure phase.

The second, third, fourth and fifth steps 206, 208, 210, 212 are repeated a predetermined number Nr-1 of times depending on the configuration of the sequence defined on the image sensor. Since the pixel allows non-destructive read operations, the succession of the various exposure phases makes it possible to accumulate signal in the memory nodes until triggering, or not triggering, the criterion.

At the end of the image acquisition sequence, depending on the scene under observation and on the configuration of the sequence, more or fewer pixels will have triggered the criterion.

At the end of the sequence, in a following sixth step 214, a phase of analog-to-digital conversion over the full resolution of the sensor is carried out, and then converted data are transmitted to a processing system to determine the distances of the objects and their three-dimensional shapes.

If the exposure time is long enough and is distributed into a set of exposure phases short enough not to accumulate too much signal at once, all of the pixels of the sensor will be able to trigger the criterion, without otherwise reaching saturation of the pixel. Under these conditions, the signal obtained at the end of the sequence will be optimum, since its signal-to-noise ratio will be maximized.

Figure 6:
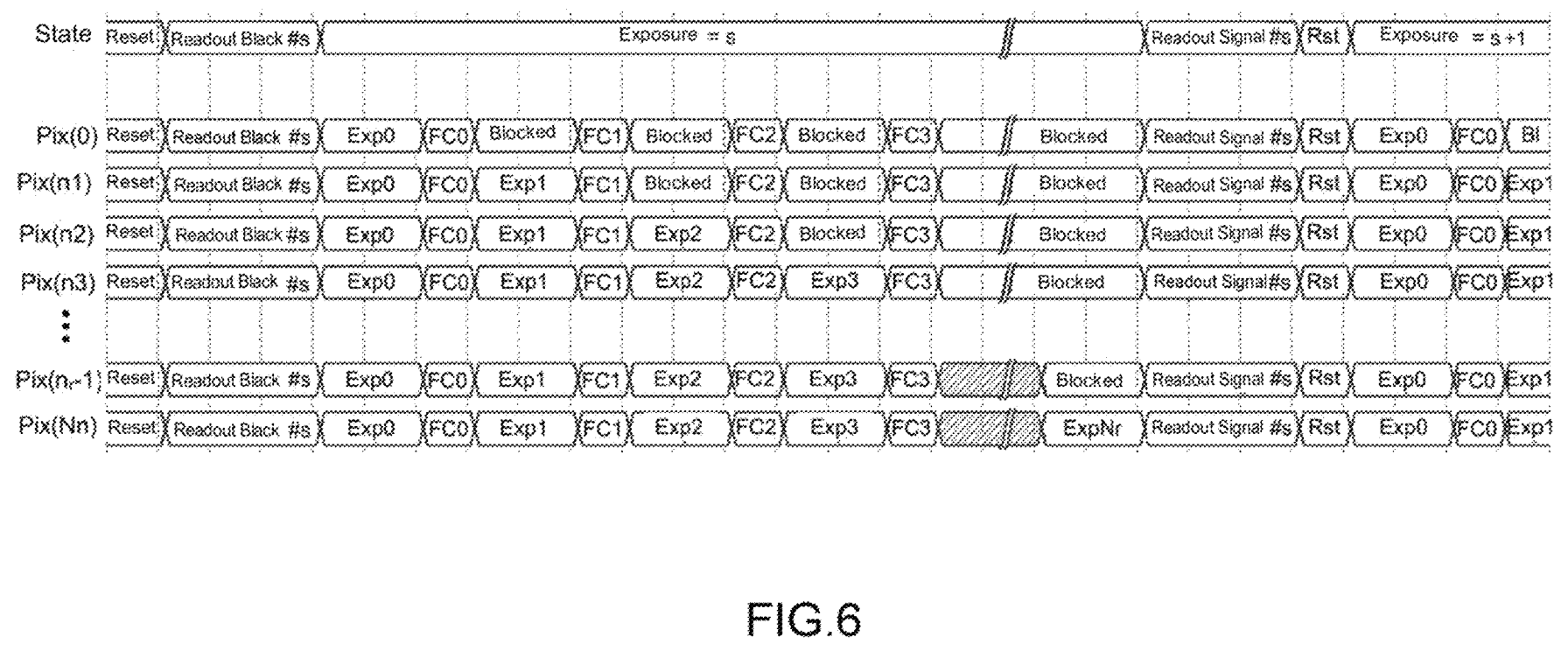

According to FIG. 6 and a diagram illustrating one example of sequencing at the pixel level of the sensor, a behavior of the various pixels of the sensor is depicted while running through the sequence that depends on the scene under observation.

Multiple pixels, denoted Pix(n), are shown in this diagram, n denoting a photon index of a level received by the pixel. The index 0 represents the highest photon intensity and the index Nn represents the lowest photon intensity. These various pixels trigger the criterion at various times, requiring, for this purpose, various numbers of elementary exposure phases.

Multiple phases of the sequencing of the CMOS image sensor are shown: the reset phase (Reset or Rst), the exposure phase (Exposure), and the conversion and readout phase (Readout). For each pixel, a reset phase (Reset or Rst), an exposure phase (Exp), a fast conversion phase (FC), an exposure inhibition phase (Blocked), and a complete conversion with readout phase (Readout Black & Signal) in order to perform external CDS (Correlated Double Sampling).

The mechanism for inhibiting the exposure of the pixel takes the form of an inhibition memory point IM (or "Inhibitor Memory") filtering or not filtering the signals for controlling the transistors for transferring the charges accumulated in the photosensitive area to the memory nodes, i.e. the signals $TRA_{k,m}$. This filtering or this transfer inhibition is implemented via filtering transistors or transfer inhibition transistors TI ("Transfer Inhibitor") positioned on the rows for the signals for controlling the transfer transistors.

The memory point $IM_k$ of the inhibition state is accessed via the selection transistor controlled by the row selection signal $SEL_k$. When it is selected, the memory point $Im_k$ of the inhibition state may be charged or discharged in order to deactivate or activate the mechanism for inhibiting exposure on the pixel in question by driving its inhibition transistors $TI_k$.

Figure 7:
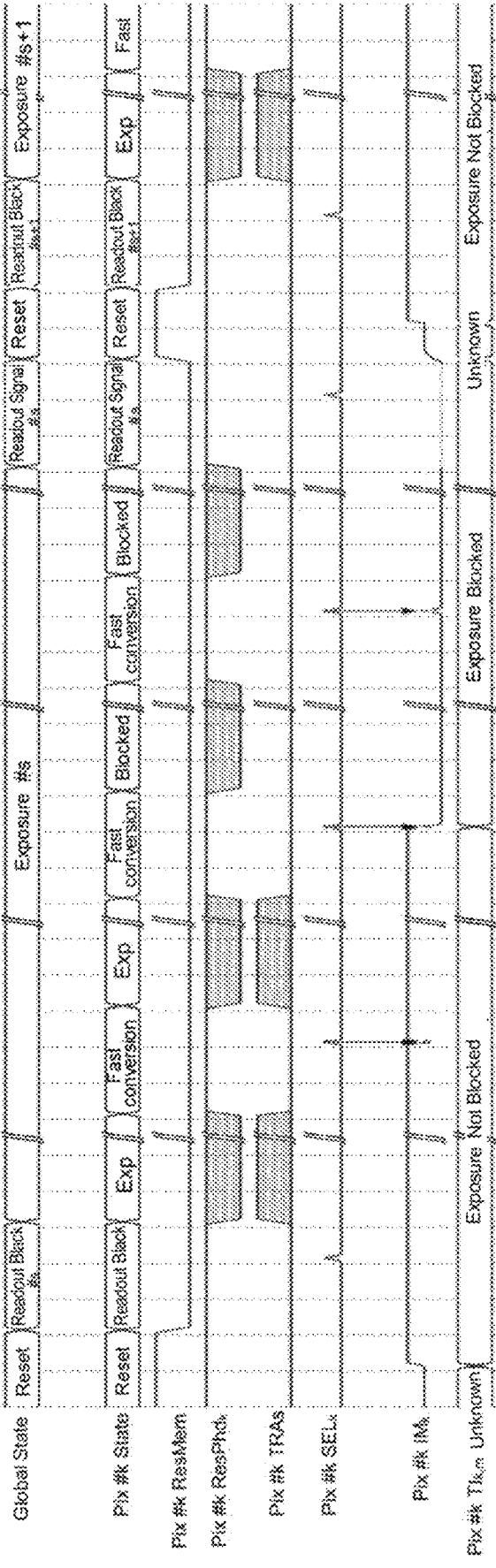
FIG. 7 is a view of the sequence for acquiring a complete image at the level of a single pixel.

According to FIG. 7 and by way of example, the sequence of a complete image seen from a single pixel is illustrated.

In the reset step, the mechanism is deactivated for all of the pixels. Conversion and readout of the reset levels is carried out here in order to perform external CDS.

An exposure phase is carried out on the pixels, followed by a non-destructive fast read operation giving, for each memory node of a pixel (FC Pix#k, Mn#x), a result used to compute the criterion (Crit Pix Col#k). In this fast conversion, the signal $SEL_k$ (Pix#k $SEL_k$) is activated in order to access the pixel.

When the criterion is valid, this updates the state of the memory point "IM" (Pix#k IM) by charging it or by discharging it. Discharging the inhibition memory point "IM" leads to the blocking of the integration on the pixel.

Chaining the exposure and fast readout phases makes it possible to trigger the criterion on the various pixels.

At the end of the sequence, a full-resolution analog-to-digital conversion is performed for each of the memory nodes of the pixels in order to transmit these data from the image sensor to the external image processing system.

Figure 8:
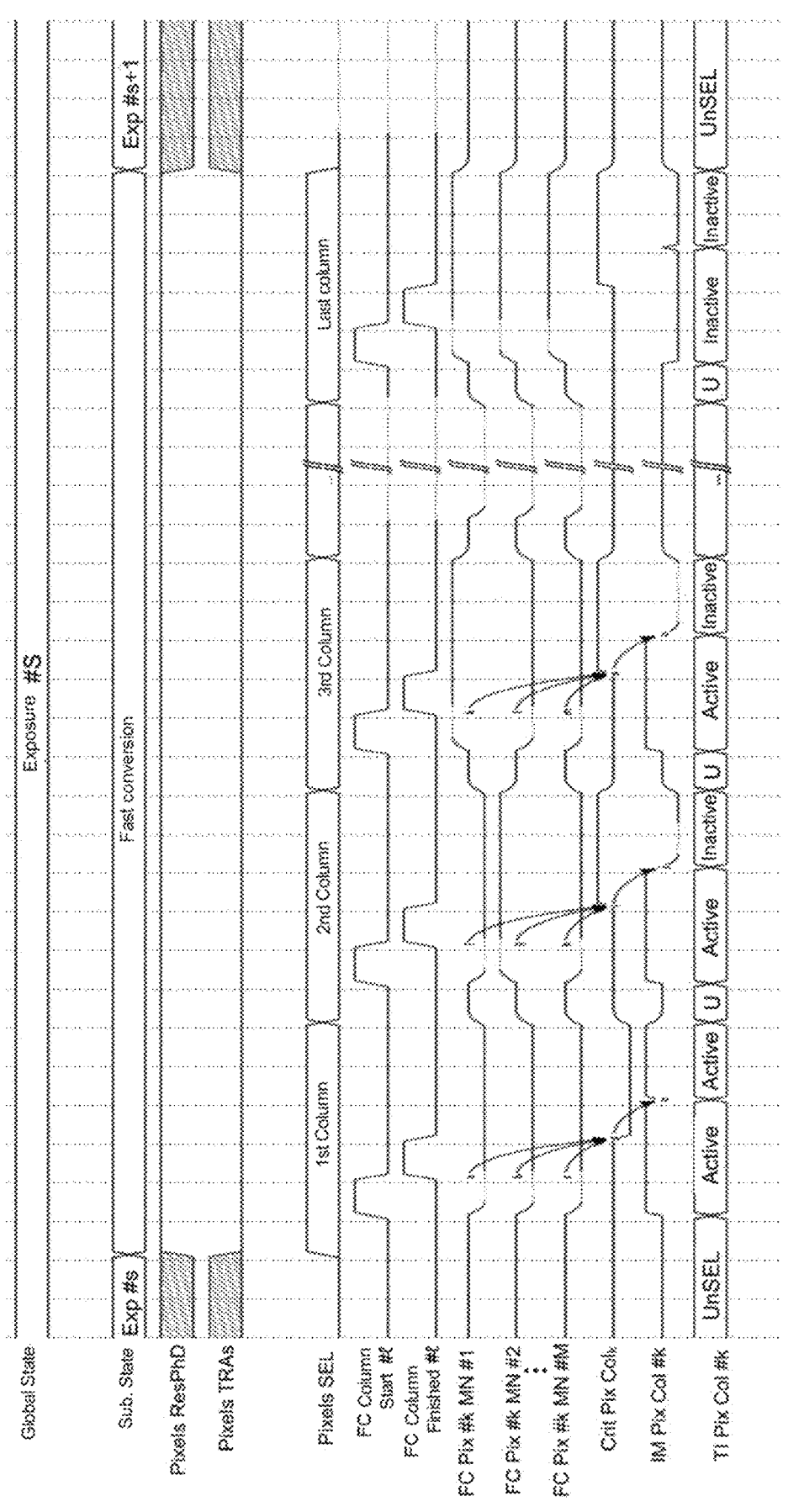
FIG. 8 is a view of the operating principle of the decision criterion in line with the non-destructive fast read operations and of its action on a mechanism for inhibiting exposure, integrated into each pixel.

According to FIG. 8 and a diagram of the sequencing of the fast read operation phases and the inhibition control phases, the operating principle of the decision criterion in line with the fast read operations is described, along with its action on the mechanism for inhibiting exposure that is integrated into each pixel. This diagram shows the fast conversion sequence and the actions on the inhibition mechanism, associated with the pixels of one and the same column.

"FC Start Row #I" indicates the time at which the fast read operation is launched, whereas "FC Done Row #I" indicates when the result of the fast conversion for each memory node will be complete.

"FC Pix #k MN #" indicates the state of the fast conversion for the memory nodes 0 to M of the pixel Pix#k currently being processed.

"Crit Pix Col#k" indicates the result of the inhibition criterion for the pixel currently being processed. "IM Pix Col #k" illustrates the voltage level applied to the inhibition memory point $IM_k$ of the pixel currently being processed.

"TI Pix Col #k" illustrates the logic state of the inhibition transistor of the pixel currently being processed.

The fast conversion uses a principle of series fast readout of the various rows. For each row l, l varying from 1 to Nl, the signal SEL for the row to be converted will be set, and then the steps of fast readout, of computing the inhibition criterion and the application thereof will be performed. Upon selection of a new row on the sensor, the states of the signals from the pixel have to be refreshed, and they therefore pass through an unknown transient state.

For each selected row, the fast read operation is launched, and then, once it is complete, the new value of the criterion is evaluated, and the state of the inhibition memory point IM is refreshed. This updates the state of the inhibition transistor TI of the current pixel for the next exposure phase.

The main advantage of this architecture is that of providing a significant reduction in the time spent on the various data conversions needed to increase the dynamic range of the sensor. This thus increases the acquisition speed.

Since the complete analog-to-digital conversions are mostly replaced by fast and partial conversions, without data transmission, the volume of data sent by the sensor is largely reduced.

The data returned when the signal is read (final analog-to-digital conversion and transmission) directly contain the result of an HDR ("High Dynamic Range") processing operation, combining the samples from multiple exposure time configurations, and suitable for indirect time-of-flight IToF distance computation.

In conventional imaging, it is sought to measure the differences in intensity between various pixels; having a uniform response between the various pixels of an image has no value.

By contrast, in indirect time-of-flight IToF, it is sought to homogenize the maximum response of the pixels on multiple images with various phase offsets (maximum response as close as possible to saturation without reaching it). Since the payload information is not located on the absolute signal, but on signal differences between the various phase-offset samples, having different exposure durations between the pixels does not pose any problem. By contrast, the same integration time should be applied to the various memory nodes of a pixel in order to guarantee coherence of the information measured within one and the same pixel.

Figure 9:
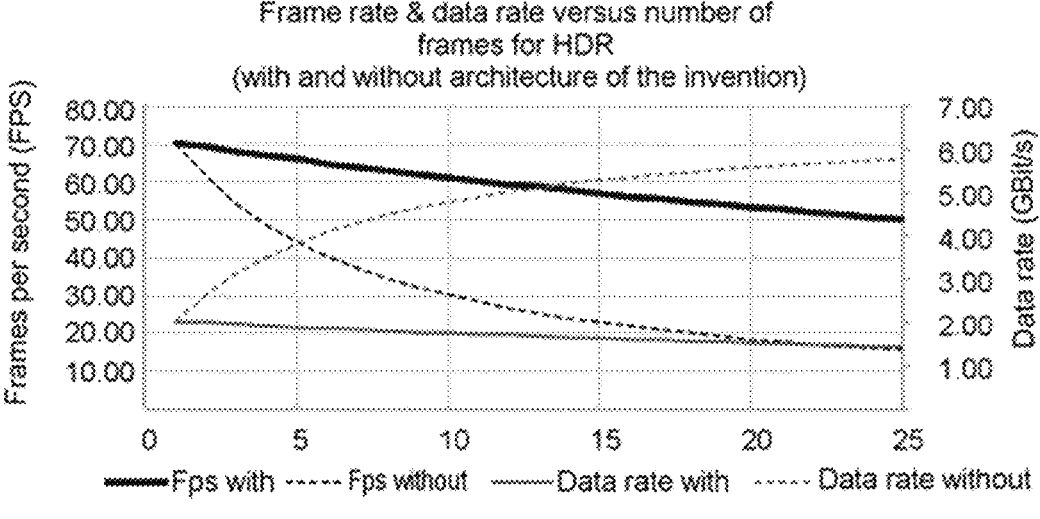
FIG. 9 is a comparative view of the evolutions of the flow of frames and data as a function of the number of exposure time configurations needed for good coverage of the scene dynamic range (i.e. HDR ("High Dynamic Range") management) in the case of a conventional image sensor and of a CMOS image sensor according to the invention.

According to FIG. 9, the comparative evolution of the acquisition speed and rate of the data sent by an image sensor as a function of the number of images used for the HDR processing (i.e. number of exposure time configurations) is illustrated between a conventional image sensor and an image sensor according to the invention.

The two image sensors whose performances are under comparison share a set of the following characteristics:

number of rows equal to 600;
  number of columns equal to 800;
  number of memory nodes per pixel equal to 3;
  analog-to-digital conversion full resolution equal to 10
    bits;
  use of external CDS (Correlated Double Sampling);
  duration of the gating pulse equal to 20.00 ns;
  aperture duty cycle equal to 20%;
  number of apertures equal to 10000.

The results of certain performance parameters for the conventional image sensor without the architecture of the invention (but incorporating a non-destructive read mechanism) are as follows:

total exposure time duration equal to 10.00 ms;
  number of exposure intervals for HDR equal to 10 (i.e.
    number of exposure time configurations for managing
    the scene dynamic range);
  absence of fast conversion phases;
  number of full read operations equal to 11;
  reset duration of the memory nodes equal to 1.00 µs;
  duration of the full conversion per row equal to 3.50 µs;
  total duration of the data conversions equal to 23.10 ms;
  total duration of a single acquisition equal to 33.10 ms;
  maximum frame rate equal to 30.21 frames per second
    (fps);
  equivalent data rate equal to 4.79 Gbit/s for 30.21 frames
    per second.

The results of certain performance parameters for the image sensor having the architecture according to the invention are as follows:

total exposure time duration equal to 10.00 ms;
  number of exposure intervals for HDR equal to 10 (i.e.
    number of exposure time configurations for managing
    the scene dynamic range);

number of fast conversion phases equal to 9;

number of full read operations equal to 2 (in order to perform external CDS);

reset duration of the memory nodes equal to 1.00 μs;

duration of the fast conversion per row equal to 0.40 μs (including evaluating the decision criterion and refreshing the inhibition mechanism);

duration of the full conversion per row equal to 3.50 μs;

total duration of the fast conversion equal to 2.16 ms;

total duration of the conversion equal to 4.20 ms;

total duration of a single acquisition equal to 16.36 ms;

maximum frame rate equal to 61.12 frames per second (fps);

maximum data rate equal to 1.76 Gbits/s;

equivalent data rate equal to 0.87 Gbits/s for 30.21 frames per second;

gain in data rate equal to 82% between the solution with and without the invention (for acquisition speed of 30.21 frames per second for both cases).

Figure 10:
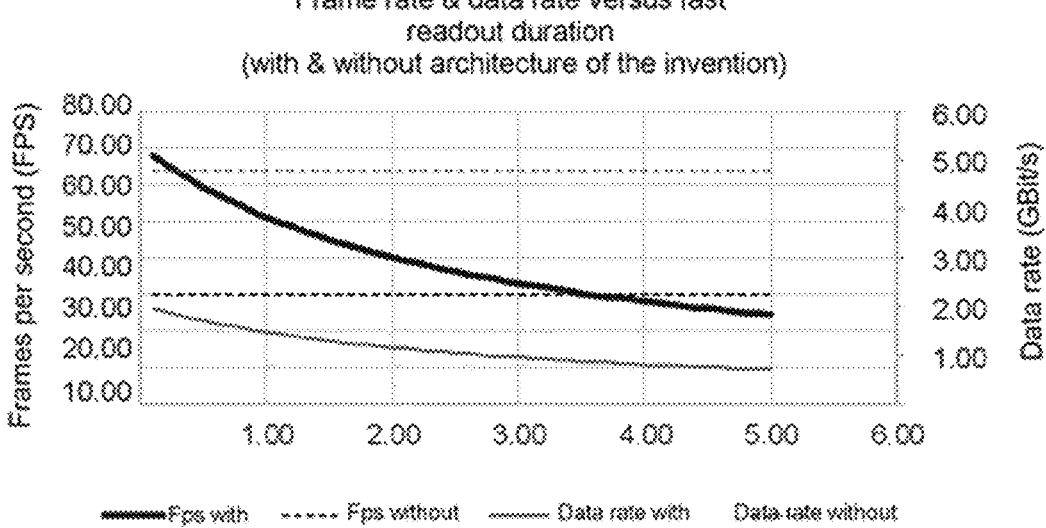
FIG. 10 is a comparative view of the evolutions of the flow of frames and data as a function of the fast conversion duration in the case of a conventional image sensor and of a CMOS image sensor according to the invention.

According to FIG. 10, the comparative evolution of the acquisition speed and rate of the data sent by an image sensor as a function of the duration of the fast conversion phase (evaluation of the criterion and refreshing of the inhibition mechanism) for 10 images that are used is illustrated between a conventional image sensor and an image sensor according to the invention, said two sensors being identical to those used to establish the performances illustrated in FIG. 9.

FIGS. 9 and 10 thus clearly show that the increase in the number of images captured to carry out HDR processing has a much lower impact on the image sensor according to the invention. Likewise, if the fast conversion is faster than a conventional conversion, the gain in acquisition speed and in data rate is significant. Likewise, if the fast conversion were not much faster than the standard conversion, the benefit of the solution remains intact since the data exchanged with the outside already incorporate the HDR processing, then greatly simplifying the management of the processing operations to be performed at the system level.

Figure 11:
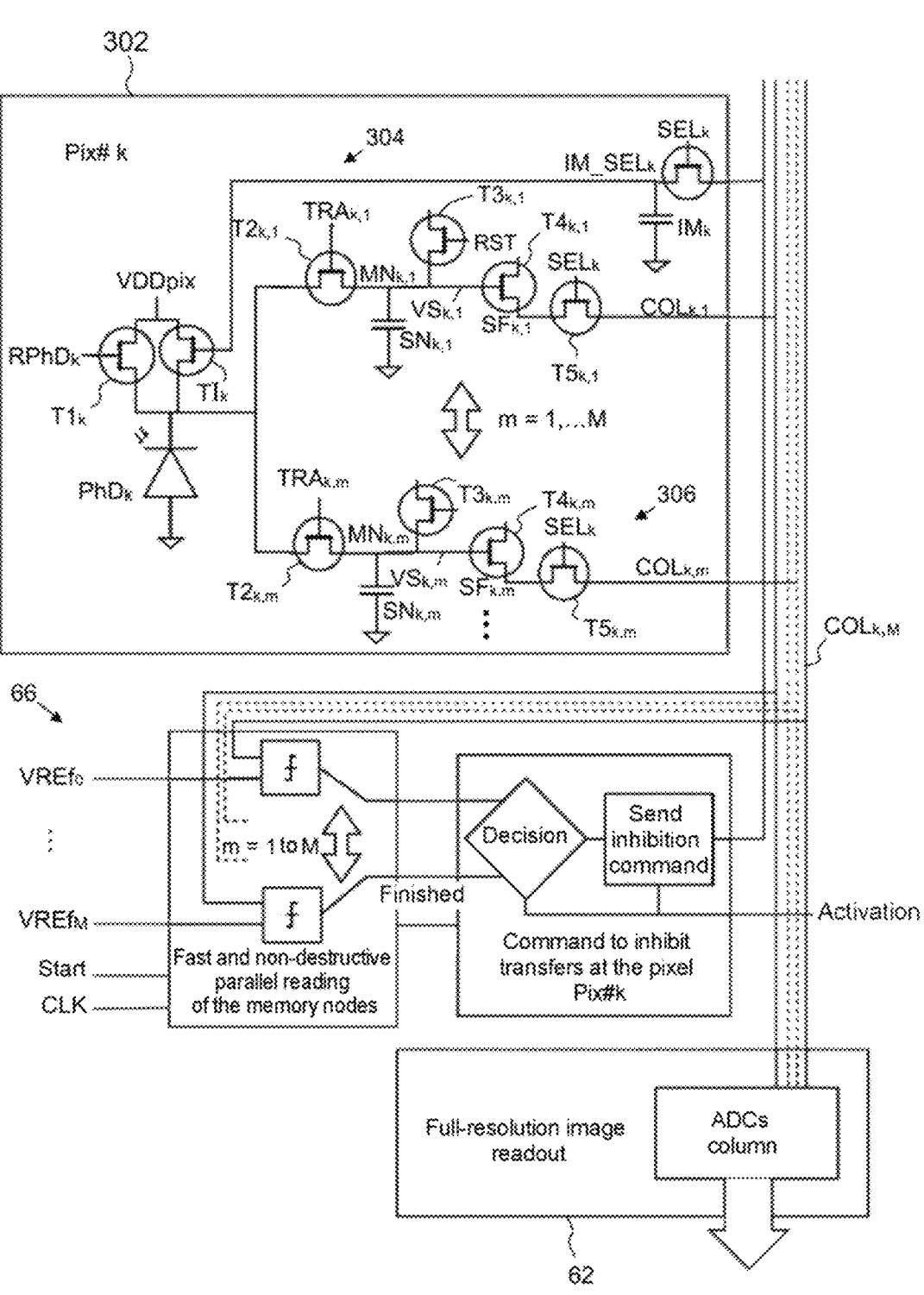
FIG. 11 is a view according to a second embodiment of a pixel and its environment, integrated into the image sensor from FIG. 3, and more generally into an image sensor according to the invention, in which the inhibition mechanism drives the resetting of the photosensitive area of the pixels Im rather than the transfer transistors.

According to FIG. 11 and a second embodiment of a pixel 302 and its environment, integrated into the image sensor from FIG. 3, and more generally a CMOS image sensor according to the invention, each pixel 302 differs from a pixel 102 from FIG. 4 through its inhibition mechanism, which drives the resetting of the photosensitive area of the pixels rather than the transfer transistors.

The operating principle in this variant is slightly different. The inhibition of the exposure of the pixel is achieved by way of resetting the photosensitive area, and not using the transfer transistors. The logic that is applied is inverted here:

by applying a voltage to the inhibition memory point $IM_k$, the photosensitive area ends up being rejected by the activation of the inhibition transistor $TI_k$, thus preventing the collection of charge during the transfer phases since these will be collected by VDDpix;

in the absence of voltage on the inhibition memory point $IM_k$, the inhibition transistor $TI_k$ is in the off state, and no action is performed on the photosensitive area. The collection of charge in the transfer phases is then maintained.

At the start of the acquisition sequence, for each pixel Pix#k, k varying from 1 to Nk, the photosensitive area $PhD_k$, the memory nodes $MN_{k,m}$, m varying from 1 to M, and the inhibition memory point are reset. The blocking mechanism is then deactivated for all of the pixels Pix#k, k varying from 1 to Nk.

After each exposure phase, the fast conversion phase is carried out, making it possible to evaluate the inhibition criterion for each pixel Pix#k, k varying from 1 to Nk. If the inhibition criterion is negative, then the inhibition memory point IMk of the pixel in question is kept discharged (deactivating the inhibition of the charge collection, the transistor TIk is in the off state). If the inhibition criterion is positive, then the inhibition memory point IMk of the pixel in question is kept charged (activating the inhibition of charge collection, the transistor TIk is activated).

Whatever the state of the inhibition device, it will always be possible to reset the photosensitive area $PhD_k$.

The invention claimed is:

1. A CMOS active-pixel image sensor with multiple memory nodes for indirect time-of-flight IToF distance measurement on a scene under observation of reflective objects comprising a set of a whole number Nk, greater than or equal to 1, of CMOS active pixels (102; 302) Pix#k, k varying from 1 to Nk, each having a photosensitive area PhDk and a whole number M, greater than or equal to 2, of memory nodes $MN_{k,m}$, m varying from 1 to M;

an image readout subsystem (62) for the M memory nodes $MN_{k,m}$ of each pixel Pix#k, k varying from 1 to Nk, for establishing, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum exposure image duration Tmax_exp, and supplying the M times Nk read digital values at output;

an image preprocessing subsystem (64) configured to apply digital processing operations to said digital values supplied at output by the image readout subsystem and send preprocessed pixel-level image data to an application system for determining indirect times-of-flight IToF of a scene under observation;

the image sensor being characterized in that it comprises:

a subsystem (66) for the fast readout of the Nk times M memory nodes $MN_{k,m}$ and for controlling a mechanism for inhibiting the exposure of the Nk pixels Pix#k, configured, on each of the Nk pixels Pix#k, k varying from 1 to Nk, to:

perform, during a current cycle Cycle_acq#k,s of acquiring an image from the Nk pixels of the sensor, a predetermined whole number Nr of non-destructive fast read operations FCr, r varying from 0 to Nr-1, on the voltages present on the M memory nodes $MN_{k,m}$, m varying from 1 to M, and after each fast read operation FCr, determine a signal for inhibiting the exposure of the pixel Pix#k, based on a decision criterion as to whether or not to continue the exposure of the pixel Pix#k, the decision criterion being dependent on the voltage values read non-destructively on the M memory nodes $MN_{k,m}$ after said fast read operation FCr; and in each pixel Pix#k, at least one transistor ($TI_k$, $TI_{km}$) for inhibiting the exposure of the pixel and a memory point ($IM_k$) able to be charged or discharged by said signal for inhibiting the pixel Pix#k in order to activate or deactivate the mechanism for inhibiting the pixel by driving its one or more inhibition transistors.

2. The CMOS active-pixel image sensor with multiple nodes for indirect time-of-flight IToF distance measurement as claimed in claim 1, wherein each pixel (102; 302) Pix#k, k varying from 1 to Nk, is configured to have its M memory nodes $MN_{k,m}$, m varying from 1 to M, integrate the electric charges generated by the photosensitive area PhDk during r elementary integration intervals INTr, r varying from 0 to Nr-1, each elementary integration interval INTr being followed by a fast read operation FCr on the M memory nodes $MN_{k,m}$ and by a re-evaluation of the inhibition decision criterion, and the r integration intervals INTr, distributed in the current cycle Cycle_acq#s of acquiring a pixel image, respectively have elementary durations Tr such that the sum of the elementary integration durations Tr, r varying from 0 to Nr-1, is equal to the predetermined maximum exposure image duration Tmax_exp.

3. The CMOS active-pixel image sensor with multiple nodes for indirect time-of-flight IToF distance measurement as claimed in claim 2, wherein the elementary durations Tr, r varying from 0 to Nr, are equal to one and the same value; or at least two elementary durations taken from among the set of values Tr, r varying from 0 to Nr-1, are different and the distribution of the values Tr, r varying from 0 to Nr-1, is chosen so as to maximize the dynamic range of the sensor.

4. The CMOS active-pixel image sensor with multiple nodes for indirect time-of-flight IToF distance measurement as claimed claim 1, comprising a sequencer (72) for activating phases of a set of phases implemented during the current cycle Cycle_acq#s by sending commands to the Nk pixels, k varying from 1 to Nk, to the subsystem for the fast readout of the Nk times M memory nodes $MN_{k,m}$ and for controlling the mechanism for inhibiting the exposure of the Nk pixels Pix#k, to the image preprocessing subsystem, said set of phases comprising:

for each pixel (102; 302) Pix#k, k varying from 1 to Nk, phases of resetting (Reset or Rst) the photosensitive area PhDk and the M memory nodes $MN_{k,m}$, m varying from 1 to M, phases of non-destructive fast readout of the M memory nodes (FCr), a phase (exp0) of initially exposing the pixel Pix#k followed by a first number Nr1 (k,s) of one or more phases of maintaining the exposure (Exp) of the pixel Pix#k and then by a number Nr2 (k,s) of one or more phases of inhibiting (Blocked) the exposure of the pixel Pix#k, the sum of the numbers Nr1 (k,s) and Nr2(k, s) being equal to Nr-1, and by a phase of image readout (Read) from the pixel Px#k; and the phases of resetting (Reset or Rst) the photosensitive areas PhDk and the M memory nodes $MN_{k,m}$, k varying from 1 to Nk and m varying from 1 to M, are executed at the same time as each acquisition of an image s in a "global shutter" mode of the Nk pixels of the image sensor.

5. The CMOS active-pixel image sensor with multiple nodes for indirect time-of-flight IToF distance measurement as claimed in claim 4, wherein, for each pixel (102; 302) Pix#k, k varying from 1 to Nk, an image read operation is performed after a phase of resetting the photosensitive area PhDk and the M memory nodes $MN_{k,m}$, m varying from 1 to M, said image read operation being used to carry out external CDS.

6. The CMOS active-pixel image sensor with multiple nodes for indirect time-of-flight IToF distance measurement as claimed claim 1, wherein each pixel (102; 302) Pix#k, k varying from 1 to Nk, configured with one and the same architecture, comprises:

the photosensitive area PhDk;

a transistor T1k for resetting the photosensitive area PhDk at the start of each cycle of acquiring an image and at the start or at the end of each micro-integration cycle, the first transistor T1k being controlled by a global reset signal RPhk common to the Nk pixels of the set of pixels;

M memory nodes $MN_{k,m}$, m varying from 1 to M, for the shared storage, on M storage channels $VS_{k,m}$, of the charges generated by the photosensitive area PhDk, and integrated in parallel during the exposure duration of the pixel Pix#k corresponding to the current cycle Cycle_acq#k,s of acquiring an image;

a device (104; 304) for synchronously blocking the exposure of the pixel Pix#k, common to the various M memory nodes Mk,m, m varying from 1 to M;

a device (106; 306) for activating access for the pixel Pix#k to the subsystem (66) for the fast readout of the Nk times M memory nodes and for controlling the mechanism for inhibiting the Nk pixels and to the image readout subsystem for the M memory nodes of the pixel Pix#k via M independent read access conductors $COL_{k,m}$, m varying from 1 to M, and an inhibition command access channel $COL_{k,IM}$.

7. The CMOS active-pixel image sensor with multiple nodes for indirect time-of-flight IToF distance measurement as claimed in claim 6, wherein, for each pixel (102; 302) Pix#k, k varying from 1 to NK, each storage channel $VS_{k,m}$, m varying from 1 to M, for storing the charges generated by the photosensitive area PhDk comprises:

a charge transfer transistor $T2_{k,m}$, configured to drain, in the memory node $MN_{k,m}$, the charges generated during the exposure image duration of the pixel Pix#k, and controlled by a charge transfer control signal $TRA_{k,m}$;

a transistor $T3_{k,m}$ for resetting the memory node $MN_{k,m}$, configured to reset the potential of the memory node $MN_{k,m}$ at the start of the current cycle Cycle_acq#k,s of an image, and controlled by a reset signal by a signal RST common to the set of the Nk pixels;

a transistor $T4_{k,m}$ for reading the memory node $MN_{k,m}$ connected in a follower configuration and configured to return, from its gate to its source, the potential level of the memory node $MN_{k,m}$; and a selection transistor $T5_{k,m}$, connected to the source of the transistor $T4_{k,m}$ for reading the memory node $MN_{k,m}$, configured to return, to the access conductor $COL_{k,m}$ in read mode via the image readout subsystem for the M memory nodes of the pixel Pi#k, the charge potential of the memory node $MN_{k,m}$, and controlled by a control signal $SEL_k$ for controlling access to the pixel Pix#k.

8. The CMOS active-pixel image sensor with multiple nodes for indirect time-of-flight IToF distance measurement as claimed in claim 7, wherein, for each pixel (102) Pix#k, k varying from 1 to Nk, the device (104) for synchronously blocking the exposure of the pixel Pix#k, common to the various M memory nodes $MN_{k,m}$, m varying from 1 to M:

is configured to modulate the control signals $TRA_{k,m}$, m varying from 1 to M, for transferring the charges generated during the exposure image duration of the pixel Pix#k, by a common modulating signal inhibiting the transfer of the charges by the charge transfer transistors $T2_{k,m}$, activated when the subsystem (66) for the fast readout of the Nk times M memory nodes and for controlling the mechanism for inhibiting the Nk pixels has decided, in line with the values read in previous non-destructive fast read operations, not to continue the exposure of the pixel, and maintained until the pixel is fully read, and comprises, for each storage channel $VS_{k,m}$, m varying from 1 to M, for storing the charges generated by the photosensitive area PhDk, a said transistor $TI_{k,m}$ for inhibiting the charge transfer control signal $TRA_{k,m}$.

9. The CMOS active-pixel image sensor with multiple nodes for indirect time-of-flight IToF distance measurement as claimed in claim 7, wherein, for each pixel (302) Pix#k, k varying from 1 to Nk, the device (304) for synchronously blocking the exposure of the pixel Pix#k, common to the various M memory nodes $MN_{k,m}$, m varying from 1 to M:

is configured to modulate the drainage of the charges generated by the photosensitive area PhDk during the exposure image duration of the pixel Pix#k to a common connecting node connecting the M charge transfer transistors $T2_{k,m}$, m varying from 1 to M, by a common modulating signal inhibiting the drainage of the charges to said common connecting node, activated when the subsystem (66) for the fast readout of the Nk times M memory nodes and for controlling the mechanism for inhibiting the Nk pixels has decided, in line with the values read during previous non-destructive fast read operations, not to continue the exposure of the pixel (302) Pix#k, and maintained until the pixel is fully read, and comprises, connected in parallel with the transistor T1k for resetting the photosensitive area PhDk, a said transistor $TI_k$ for inhibiting the drainage of the charges generated by the photosensitive area PhDk to said common node.

10. The CMOS active-pixel image sensor with multiple nodes for indirect time-of-flight IToF distance measurement as claimed in claim 7, wherein the memory point $(IM_k)$ of the inhibition mechanism is accessed via a transistor controlled by the control signal $SEL_k$.

11. The CMOS active-pixel image sensor with multiple nodes for indirect time-of-flight IToF distance measurement as claimed in claim 1, wherein the Nk pixels, k varying from 1 to Nk, are arranged in a matrix form (54) in a whole number Nl, greater than or equal to 2, of rows, and a whole number Nc, greater than or equal to 2, of columns, Nk being equal to the product of Nc and Nl; and furthermore comprising a row decoder (68), configured to allow, row by row over predetermined time windows and at the same time, the pixels of one and the same row l to access the processing resources of the full-resolution image readout subsystem (62) and of the subsystem (66) for the fast and non-destructive readout of the Nc times M memory nodes $MN_{k,m}$ and for controlling the mechanism for inhibiting the exposure of the Nc pixels of said same row l, and thus pool the processing resources of the full-resolution image readout subsystem (62) and of the subsystem (66) for fast readout and for controlling the mechanism for inhibiting the exposure of the pixels column by column.

12. A device for indirect time-of-flight IToF distance measurement on a two-dimensional or three-dimensional object scene comprising:

an emitter source (8) emitting a series of light pulses;

a CMOS active-pixel image sensor with multiple memory nodes (12; 52) as claimed in claim 1 for converting the light pulses reflected by the objects in the scene (6) into pixel data characterizing one or more images; and a block (14) for processing the pixel data from the one or more images in order to determine a field of depths of the objects in the scene (6) seen from a location where the emitter source (8) and the image sensor (12; 53) are located.

13. A method for implementing a CMOS active-pixel image sensor with multiple memory nodes for indirect time-of-flight IToF distance measurement on a scene under observation, the image sensor (52) comprising:

a set of a whole number Nk, greater than or equal to 1, of CMOS active pixels (102; 302) Pix#k, k varying from 1 to Nk, each having a photosensitive area PhDk and a whole number M, greater than or equal to 2, of memory nodes $MN_{k,m}$, m varying from 1 to M;

a subsystem (66) for the non-destructive fast readout of the Nk times M memory nodes $MN_{k,m}$ and for controlling the mechanism for inhibiting the exposure of the Nk pixels Pix#k, implemented during the acquisition of an image by the Nk pixels;

an image readout subsystem (62) for the M memory nodes $MN_{k,m}$ of each pixel Pix#k, k varying from 1 to Nk;

an image preprocessing subsystem (64);

the method for implementing the image sensor during the acquisition of an image comprising steps in which:

the image readout subsystem (62) reads the M memory nodes $MN_{k,m}$ of each pixel (102; 302) Pix#k, k varying from 1 to Nk, establishes, through analog-to-digital conversion, Nk times M digital values, representative of quantities of charges generated by the photosensitive areas PhDk, k varying from 1 to Nk, and integrated by the M memory nodes $MN_{k,m}$ during a pixel exposure image duration, less than or equal to a predetermined maximum exposure image duration Tmax_exp, and supplies the M times Nk read digital values at output;

the image preprocessing subsystem (64) applies digital processing operations to said digital values supplied at output by the image readout subsystem (62) and sends preprocessed pixel-level image data to an application system for determining indirect times-of-flight IToF of a scene under observation; and the method for implementing the image sensor being characterized in that:

the subsystem (66) for the non-destructive fast readout of the Nk times M memory nodes $MN_{k,m}$ and for controlling the mechanism for inhibiting the exposure of the Nk pixels Pix#k, on each of the Nk pixels Pix#k, k varying from 1 to Nk, performs, during a current cycle Cycle_acq#k,s of acquiring an image s, a predetermined whole number Nr of non-destructive fast read operations FCr, r varying from 0 to Nr-1, on the voltages present on the M memory nodes $MN_{k,m}$, m varying from 1 to M, and after each fast read operation FCr, determines a signal for inhibiting the exposure of the pixel Pix#k, based on a decision criterion as to whether or not to continue the exposure of the pixel Pix#k, the decision criterion being dependent on the voltage values read non-destructively from the M memory nodes $MN_{k,m}$ after said fast read operation FCr and on one or more decision thresholds; and the signal for inhibiting each pixel Pix#k charges or discharges an inhibition memory point $(IM_k)$ of the pixel Pix#k in order to activate or deactivate the mechanism for inhibiting the pixel by driving at least one transistor $(TI_k, TI_{km})$ for inhibiting the exposure of the pixel.

* * * * *